UNITED STATES PATENT OFFICE.

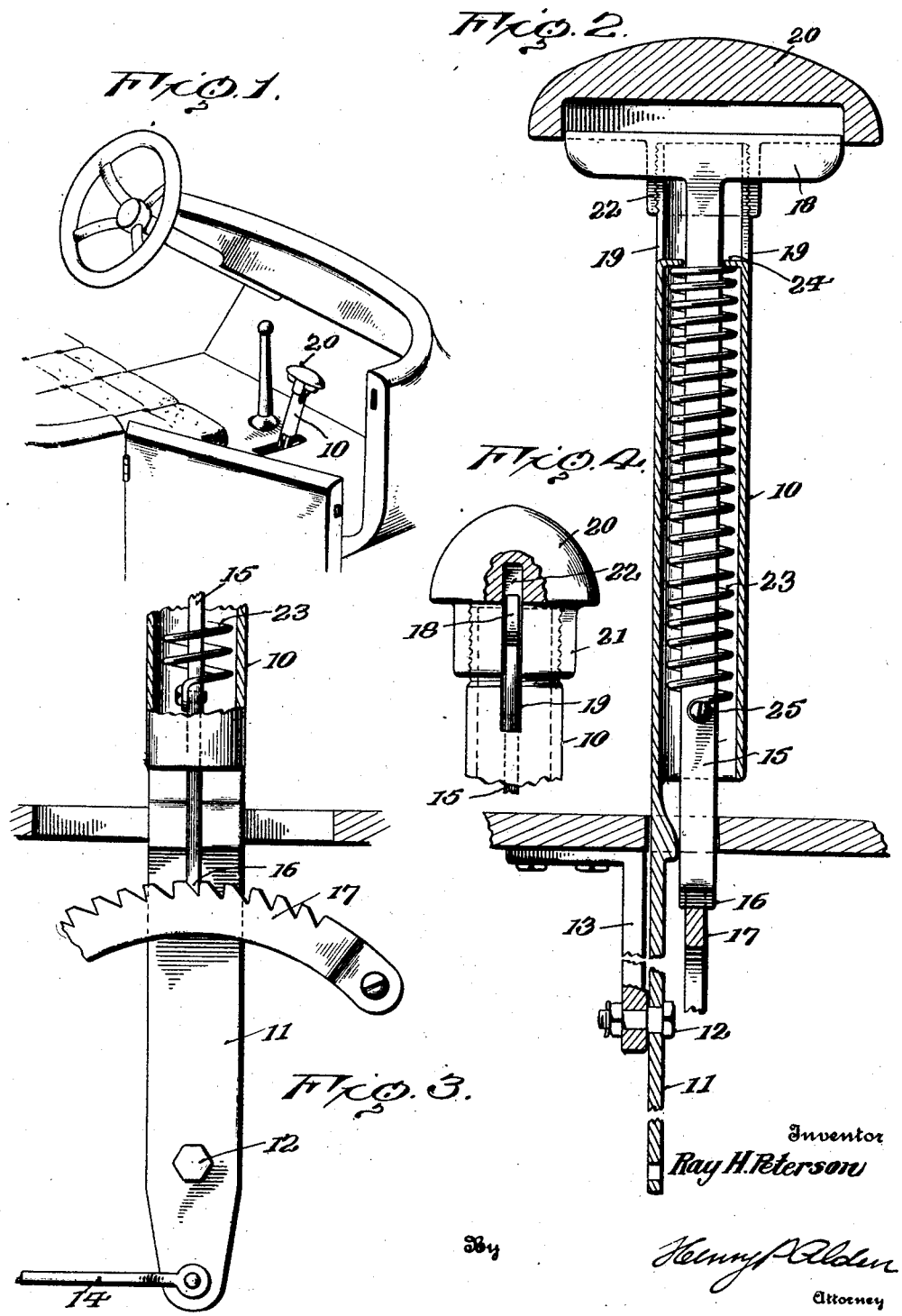

RAY H. PETERSON, OF BOISE, IDAHO.

HAND-BRAKE MECHANISM.

1,333,092. Specification of Letters Patent. Patented Mar. 9, 1920.

Application filed May 10, 1919. Serial No. 296,049.

*To all whom it may concern:*

Be it known that I, RAY H. PETERSON, a citizen of the United States, residing at Boise, county of Ada, State of Idaho, have invented new and useful Improvements in Hand-Brake Mechanism, of which the following is a specification.

This invention relates to certain new and useful improvements in brakes of the emergency type and has more especial reference to the hand or manually operated portion thereof whereby the maximum pressure may be brought to bear in the manipulation of the brake and this with a minimum of effort on the part of the user.

Another object of the invention is to provide a brake which is of simple durable construction, neat in appearance, readily taken apart for the purpose of repair or cleaning, and one in which the working parts are most thoroughly protected against injury by the elements.

Other and further objects and advantages of the invention will be hereinafter set forth and the novel features thereof defined by the appended claims.

In the drawing:—

Figure 1 is a perspective of the invention showing it applied to an automobile only a portion of which is illustrated.

Fig. 2 is an enlarged detail vertical section of the device taken on a line transverse of the automobile and showing the manually operated portion disposed therein;

Fig. 3 is an enlarged detail, partly in section, of the lower portion of the device showing the rod that connects with the brake band or shoe (not illustrated) attached below the fulcrum; and Fig. 4 is a similar detail of the upper portion of the device.

Like numerals of reference refer to like parts in the several figures of the drawing.

In depicting the utility of my invention, I have shown it as applied to an automobile, partly illustrated, though it will of course be understood that it may be readily adapted to numerous other uses as well.

In the drawing, the numeral 10 represents a tubular lever whose lower portion is fashioned into a flat bar as 11 fulcrumed at 12 to the chassis or body of the automobile through the medium of a bracket 13 and operably connected at its lower extremity with a rod 14 leading to the usual brake-band or shoe (not shown). Disposed within the tubular lever is the shank 15 of a substantially T-shaped latch or pull-rod terminating at its lower end in a pawl 16 designed to engage a notched segment 17 of usual construction for retaining the pull-rod in position when set. The head or handle 18 of the pull-rod extends transversely of the automobile in alined opposite directions through vertical slots 19 formed in the walls of the tubular lever for a purpose which will hereinafter appear.

At its upper portion, the tubular lever is exteriorly provided with screw-threads by means of which a bulbous elongated handpiece 20 disposed transversely of the automobile and having an interiorly threaded reduced portion 21 may be attached as shown. When so attached, it will be seen by reference to the drawing that the slots 19 in the tubular lever are caused to aline with a similar elongated slot 22 formed in the hand-piece 20. The bulbous portion of this hand-piece may be of any preferred configuration but is represented in the drawing as of semi-oval shape extending sufficiently beyond the extremities of the head or handle of the pullrod to insure proper protection thereof from the weather.

A helical spring 23 surrounds the shank of the pull-rod and bears at its upper extremity against lugs 24 struck in from the tubular lever of which they are here shown as integral parts. At its lower end, the spring is attached to the shank itself by means of a screw 25. The stress of this spring tends to lower the pawl of the pull-rod into holding engagement with the notched segment.

The operation of my invention will be readily understood from the foregoing description taken together with the drawing. By its use, the operator is enabled to manipulate or move the brake lever in the most advantageous position as it permits a straight upward pull in a natural manner which is not so possible in operating the brake levers now on the market.

What I claim is:—

1. A brake lever comprising a tubular member having diametrically opposite slots at its upper end, a hand piece mounted on the tubular member and having a recess in its under face arranged to register with the slots in the tubular member, and an operating member mounted in the under side of the hand piece to slide in said slots and recess.

2. A brake lever having its upper end terminating in a hand piece provided with a recess in its under face, and a T-shaped operating member mounted in said lever and having the entire upper edge of its head disposed at all times within the recess of said hand piece for sliding movement therein.

3. A brake lever comprising a tubular member having diametrically opposite slots at its upper end, a hand piece mounted on the tubular member and having a recess in its under face arranged to register with the slots in the tubular member, and an operating member mounted in the tubular member and having its upper edge projecting at all times into the recess of said hand piece for sliding movement in said slots and recess.

RAY H. PETERSON.

Witnesses:
LENA MICHEL,
FRANK MICHEL.